United States Patent
Turányi et al.

(10) Patent No.: US 8,503,306 B2
(45) Date of Patent: Aug. 6, 2013

(54) TECHNIQUE FOR ROUTE OPTIMIZATION IN A COMMUNICATION NETWORK

(75) Inventors: Zoltán Richárd Turányi, Szentendre (HU); György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 355 days.

(21) Appl. No.: 12/811,337

(22) PCT Filed: Jan. 28, 2008

(86) PCT No.: PCT/EP2008/000079
§ 371 (c)(1),
(2), (4) Date: Jun. 30, 2010

(87) PCT Pub. No.: WO2009/086848
PCT Pub. Date: Jul. 16, 2009

(65) Prior Publication Data
US 2011/0007632 A1    Jan. 13, 2011

(51) Int. Cl.
*G08C 15/00* (2006.01)
(52) U.S. Cl.
USPC ............ 370/236; 370/235; 370/349; 370/401
(58) Field of Classification Search
USPC .................... 370/235, 236, 349, 401
See application file for complete search history.

(56) References Cited

U.S. PATENT DOCUMENTS

| 7,020,087 B2 * | 3/2006 | Steinberg et al. | 370/238 |
| 7,356,595 B2 * | 4/2008 | Soininen et al. | 709/227 |
| 7,885,248 B2 * | 2/2011 | Harper et al. | 370/349 |

(Continued)

FOREIGN PATENT DOCUMENTS

| EP | 1 531 645 A1 | 5/2005 |
| EP | 1 841 275 A | 10/2007 |
| WO | WO 2006/041183 A1 | 4/2006 |
| WO | WO 2007/073773 A1 | 7/2007 |

OTHER PUBLICATIONS

3GPP, 3$^{rd}$ Generation Partnership Project; Technical Specification Group Services and System Aspects; General Packet Radio Service (GPRS); Service Description; Stage 2 (Release 7). 3GPP TS 23.060 v7.6.0. Dec. 2007.

(Continued)

*Primary Examiner* — Jay P Patel (57) ABSTRACT

A technique for route optimization in a communication network is provided. A method implementation of this technique comprises the steps of providing a first data element containing information about first data session between a mobile terminal and a first gateway node and further containing mobility management information regarding the mobile terminal, wherein the first data element is associated with a first network address, providing a second data element containing information about a second data session between the mobile terminal and a second gateway node and further containing mobility management information regarding the mobile terminal, wherein the second data element is associated with a second network address, and switching an association of network traffic with the first data element to an association of network traffic with the second data element in order to optimize the flow of network traffic within the communication network.

12 Claims, 9 Drawing Sheets

(56) References Cited

U.S. PATENT DOCUMENTS

| | | | |
|---|---|---|---|
| 8,144,684 B2* | 3/2012 | Harper et al. | 370/349 |
| 2006/0114855 A1* | 6/2006 | Zheng | 370/331 |
| 2007/0213057 A1* | 9/2007 | Shaheen | 455/436 |
| 2007/0232301 A1 | 10/2007 | Kueh | |
| 2007/0253371 A1* | 11/2007 | Harper et al. | 370/331 |
| 2008/0132268 A1* | 6/2008 | Choi-Grogan et al. | 455/550.1 |
| 2008/0132269 A1* | 6/2008 | Shen et al. | 455/550.1 |
| 2008/0153484 A1* | 6/2008 | Boni et al. | 455/433 |
| 2008/0186925 A1 | 8/2008 | Cheng et al. | |
| 2009/0061855 A1* | 3/2009 | Sethi et al. | 455/432.2 |
| 2009/0323635 A1* | 12/2009 | Gras et al. | 370/331 |
| 2010/0150057 A1* | 6/2010 | Miklos et al. | 370/328 |
| 2010/0157946 A1* | 6/2010 | Nasielski et al. | 370/331 |
| 2010/0246500 A1* | 9/2010 | Rydnell et al. | 370/329 |
| 2011/0122844 A1* | 5/2011 | Harper et al. | 370/331 |
| 2011/0194497 A1* | 8/2011 | Lundin | 370/328 |
| 2012/0057584 A1* | 3/2012 | Johansson et al. | 370/338 |

OTHER PUBLICATIONS

3GPP $3^{rd}$ Generation Partnership Project: Technical Specification Group Core Network and Terminals; Mobile Radio interface Layer 3 Specification: Core Networks Protocols; Stage 3 (Release 8). 3GPP TS 24.008 v8.0.0. Dec. 2007.

* cited by examiner

TECHNIQUE FOR ROUTE OPTIMIZATION IN A COMMUNICATION NETWORK

TECHNICAL FIELD

The invention generally relates to the field route optimization in a communication network. Specifically, the invention relates to optimizing the flow of network traffic within a communication network between a mobile terminal and gateway nodes.

BACKGROUND

Mobility management has become an important feature of mobile communication networks. For this reason, several mobility management standards have evolved over the last years.

One standardized mobility management protocol is the General Packet Radio Service (GPRS) tunneling protocol (GTP). GTP is an Internet protocol (IP) based network protocol used within Third Generation Partnership Project (3GPP) networks such as Universal Mobile Telecommunications System (UMTS) networks. GTP is used for mobility management over the roaming interfaces of 3GPP networks. In addition to mobility management, GTP provides session management, bearer control for Quality of Service (QoS) and other network functions. GTP is described in document 3GPP TS 29.060, "Third Generation Partnership Project, Technical Specification Group Core Network and Terminals; General Packet Radio Service (GPRS); GPRS Tunneling Protocol (GTP) across the Gn and GP interface (Release 8)" in detail.

Another standardized mobility management protocol is Mobile IPv6 (MIPv6). MIPv6 is a generic mobility protocol which allows a mobile terminal to transparently maintain network connections while moving from one subnet to another. In MIPv6, mobile terminals are authenticated by means of IPv6 addresses. MIPv6 provides direct routing between IPv6 correspondent nodes (CN) and mobile terminals for optimizing the flow of network traffic. This direct routing is described in document "Mobility support in IPv6", RFC 3775 by the Internet Engineering Task Force (IETF).

Other IETF protocols enabling a host to receive traffic through multiple points of attachment, such as the Level 3 Multihoming Shim Protocol for IPv6 (shim6) or the Host Identity Protocol (HIP), are known as well.

Shim6 specifies a layer 3 shim protocol for providing locator agility below the transport protocols. Thereby, multihoming for IPv6 can be provided with failover and load spreading properties. Shim6 is described in document "Level 3 multihoming shim protocol for IPv6", internet draft, draft-IETF-shim-6-proto-07.text by IETF.

HIP provides a method of separating the end-point identifier and locator rolls of IP addresses and introduces a new host identity name space. The host identity protocol is described in document "Host Identity Protocol (HIP) architecture", RFC 4423 by IETF.

Network protocols like GTP, MIPv6, shim6 and HIP comprise distinctive mobility features. However, they also lack important network management features which other protocols support.

For example, GTP is embedded into the 3GPP architecture and provides QoS and bearer control features, but does not support route optimization of network traffic. However, route optimization may be useful to avoid so called "triangle routing". Triangle routing concerns the situation that a mobile terminal wants to send data packets to another mobile terminal within the same network. However, the other mobile terminal may be located far away from its home network. Since no direct path is provided by means of route optimization, the data packets are tunneled through the network in order to reach the home agent and are subsequently tunneled back across the network to reach the foreign agent. Thereby, network capacity is unnecessarily occupied.

On the other hand, MIPv6 supports route optimization. However, MIPv6 lacks the ability to provide bearer control for QoS. Moreover, MIPv6 is not embedded into the 3GPP architecture. However, most worldwide network operators operate and are expanding in networks according to the 3GPP standards.

Shim6 and HIP provide a possibility of communicating via CNs by using a direct path. However, similar to MIPv6, shim6 and HIP lack QoS and bearer control features.

SUMMARY

Accordingly, there is a need for a technique for route optimization in a communication network which avoids at least some of the disadvantage outlined above.

This need is satisfied according to a first aspect by a method for route optimization in a communication network. The method comprises the steps of providing a first data element containing information about a first data session between a mobile terminal and a first gateway node and further containing mobility management information regarding the mobile terminal, wherein the first data element is associated with a first network address, providing a second data element containing information about a second data session between the mobile terminal and a second gateway node and further containing mobility management information regarding the mobile terminal, wherein the second data element is associated with a second network address, and switching an association of network traffic with the first data element to an association of network traffic with the second data element in order to optimize the flow of network traffic within the communication network.

The communication network may be a network according to a 3GPP standard, for example a UMTS network. However, the present technique is not limited to networks according to a 3GPP standard. Any other telecommunication standard or protocol may as well be used. In case of a communication network according to a 3GPP standard, the first and the second data elements may be packet data protocol (PDP) contexts containing information about a packet data session (e.g. IP address, QoS or routing information) between the mobile terminal and the gateway nodes. The mobile terminal may be any kind of communication terminal, for example a mobile telephone, which is capable of communicating within the communication network. The first and the second gateway nodes may be Gateway GPRS Support Nodes (GGSN). The first and the second data sessions may be data sessions between the mobile terminal and a first and second GGSN via a Serving GPRS Support Node (SGSN). The mobility management information may for example comprise location update, routing or roaming information.

In case the mobile terminal moves from the coverage area of his home communication network to the coverage area of another communication network, the first gateway node is the home gateway node and the second gateway node is the local gateway node of the visited communication network. In order to optimize the flow of network traffic within the communication network, an association of network traffic with the first data element, i.e. the first data session via the home gateway node, may be switched to an association of network traffic with the second data element, i.e. the second data session via the local gateway node. However, the present technique for route optimization is not limited to the above explained roaming scenario. The first and the second gateway nodes may as well belong to one and the same communication network having a large coverage area. In this case, the first gateway node is the home gateway node providing an initial connection for the mobile terminal and the second gateway node is the local gateway node being located nearer to the mobile terminal than the home gateway node.

The network address associated with the first data element, which belongs to the first data session via the home gateway node, may be the permanent IP address of the mobile terminal and the second network address associated with the second data element, which belongs to the second data session via the local gateway node, may be a sort of supplemental or "take care of" IP address which may specifically be used for optimizing the flow of network traffic within the communication network.

In order to ensure that the required amount of network resources is always, i.e. irrespective of whether route optimization is used or not, allocated for the network traffic flow, the first and the second data elements may share network resources. The first and the second data elements may for example be mapped on the same radio bearer. For example, in case of a 3GPP communication network, two separate PDP contexts may be mapped on the same radio bearer. This provides an effective sharing of network resources between the first and second data elements.

Alternatively, the first and second data elements may also be mapped on separate radio bearers but may, however, use the same radio resources. For this method implementation, the scheduling algorithm for the radio bearers may be modified in that scheduling of multiple radio bearers using the same set of radio resources is enabled.

According to a further aspect, a method for route optimization in a communication network is provided. The method comprises the steps of providing a first data element containing information about a first data session between a mobile terminal and a first gateway node and further containing mobility management information regarding the mobile terminal, wherein the first data element is associated with a first and a second network address, and optimizing the flow of network traffic within the communication network by means of the first data element. This method for route optimization differs from the method for route optimization according to the first aspect in that only a single data element is provided. However, this data element is associated with a first and a second network address. For example, in case of a communication network according to a 3GPP standard, the first data element may be a PDP context. In this case, the PDP context may be modified in that multiple IP addresses can be assigned to the single PDP context.

In one method implementation, the mobility management information may comprise a tunnel ID. For example, in communication networks according to the 3GPP standard, the tunnel ID is a number allocated by the GGSN which is designating the tunnel data within the PDP context. By means of the tunnel ID, defective routing of the flow of network traffic within the communication network can be avoided.

According to a further aspect, the method may comprise the steps of providing a third data element which is associated with the first data element and providing a fourth data element which is associated with the second data element. The third and the fourth data elements may for example be secondary PDP contexts. The secondary PDP contexts may provide QoS data, e.g. for newly arrived real-time network traffic. The secondary PDP contexts may also provide different QoS for different network flows. Such secondary PDP contexts may be established for both primary PDP contexts. In case the two primary PDP contexts share resources, the flow of network traffic will receive the required amount of network resources, irrespective of whether route optimization is used or not.

In one method implementation, the second and third data elements comprise information regarding network resource reservation. Thereby, different QoS for different network flows may be provided.

The data elements, i.e. one or more of the first, second, third and fourth data elements, may be generated by at least one of the mobile terminal, a support node, the first gateway node, the second gateway node, a policy control system or any other suitable network component.

In one method implementation, the method may further comprise the step of sending a Binding Update message to a correspondent node. A correspondent node is a network node that communicates or corresponds with the mobile terminal. The correspondent node may be either mobile or stationary. The mobile terminal requires no home agent to be reachable via the first network address. However, in order to optimize the routing of network traffic, Binding Update messages may be sent by the mobile terminal to a correspondent node so that route optimized network traffic may be transmitted over the second, i.e. the local, gateway node via the second data session.

In case an association of network traffic with the first data elements is switched to an association of network traffic with the second data element, all non-route optimized network traffic may be associated with the first data element. Accordingly, all route optimized network traffic may be associated with the second data element.

The invention can be practiced in the form of hardware, in the form of software and in the form a combined hardware/software approach. As for a software approach, a computer program product is provided. The computer program product comprises program code portions for performing one or more of the steps of the methods described herein when the computer program product is run on one or more components of a network. The computer program product may be stored on a computer-readable recording medium.

As for a hardware aspect, a network node is provided. The network node comprises a function for providing a first data element containing information about a first data session between a mobile terminal and a first gateway node and further containing mobility management information regarding the mobile terminal, wherein the first data element is associated with a first network address, a function for providing a second data element containing information about a second data session between the mobile terminal and a second gateway node and further containing mobility management information regarding the mobile terminal, wherein the second data element is associated with a second network address, and a function for switching an association of network traffic with the first data element to an association of network traffic with the second data element in order to optimize the flow of network traffic within the communication network. In case that the communication network is a network according to a 3GPP standard, the network node may be a GGSN.

According to a further hardware aspect, an alternative network node is provided. The network node comprises a function for providing a first data element containing information about a first data session between a mobile terminal and a first gateway node and further containing mobility management information regarding the mobile terminal, wherein the first data element is associated with a first and a second network address, and a function for optimizing the flow of network traffic within the communication network by means of the second data element. In case the communication network is a network according to a 3GPP standard, the network node may be a GGSN.

According to a still further hardware aspect, a mobile terminal is provided. The mobile terminal comprises a function for providing a first data element containing information about a first data session between the mobile terminal and a first gateway node and further containing mobility management information regarding the mobile terminal, wherein the first data element is associated with a first network address, a function for providing a second data element containing information about a second data session between the mobile terminal and a second gateway node and further containing mobility management information regarding the mobile terminal, wherein the second data element is associated with the second network address, whereby the second data element is used for optimizing the flow of network traffic within the communication network.

According to a still further hardware aspect, a communication network comprising a first gateway node, a second gateway node and a network node is provided.

According to a further aspect, a traffic flow template (TFT) is provided. The TFT is capable of being assigned to a data element which is containing information about a data session between a mobile terminal and a gateway node and mobility management information regarding the mobile terminal. The TFT comprises information regarding routing of network traffic and information regarding whether the information regarding routing of network traffic is related to an optimized network route. TFTs are generally described in document 3GPP TS 24.008 "Technical Specification Group Core Network and Terminals; Mobile Radio Interface Layer 3 Specification; Core Network Protocols, Stage 3", which is hereby in its entirety incorporated by reference.

TFTs are generally used for distinguishing between different user traffic flows. A TFT may be implemented as a series of filters that allows traffic that matches the filters to be routed on a particular PDP context. When incoming network traffic arrives at a mobile terminal, a packet classifier typically provides a PDP context selection based on the TFT and maps the incoming data packets with specified QoS attributes on the correct PDP context. Thereby, multiple secondary PDP contexts can be associated with the same PDP address, which is defined by the primary PDP context. By means of the TFT, network traffic can be mapped to a data session even if various options, i.e. data sessions, for route optimization are possible.

The TFT may define the IP network traffic flow by using the IP address and information from the transport header of a data packet (usually port numbers) of the network traffic flow. The TFT may be extended in that it indicates if the IP addresses refer to the source and destination fields of the IP packet or the home addresses of the mobile terminal and the correspondent node. The classifier of the TFT is extended accordingly in order to be able to parse the data packet and to extract the home addresses in case such indication is present in the descriptor of the TFT.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following, for purpose of explanation and not limitation, specific details are set forth, such as particular sequences of steps, interfaces and configurations, in order to provide a thorough understanding of the present invention. It will be apparent to one skilled in the art that the present invention may be practiced in other embodiments that depart from these specific details.

Moreover, those skilled in the art will appreciate that the functions and processes explained herein below may be implemented using software functioning in conjunction with a programmed microprocessor or general purpose computers. It will also be appreciated that while embodiments are primarily described in the form of methods and apparatuses, the invention may also be embodied in a computer program product as well as in a system comprising a computer processor and a memory coupled to the processor, wherein the memory is encoded with one or more programs that may perform the functions disclosed herein.

In the following embodiments, various exemplary scenarios of optimizing the flow of network traffic within a communication network are disclosed. These exemplary embodiments are based on 3GPP communication networks and GTP and MIPv6 network protocols. However, the present invention is not limited to 3GPP communication networks and GTP or MIPv6 network protocols. The present invention may as well be employed in other communication networks and with other network protocols.

Figure 1:
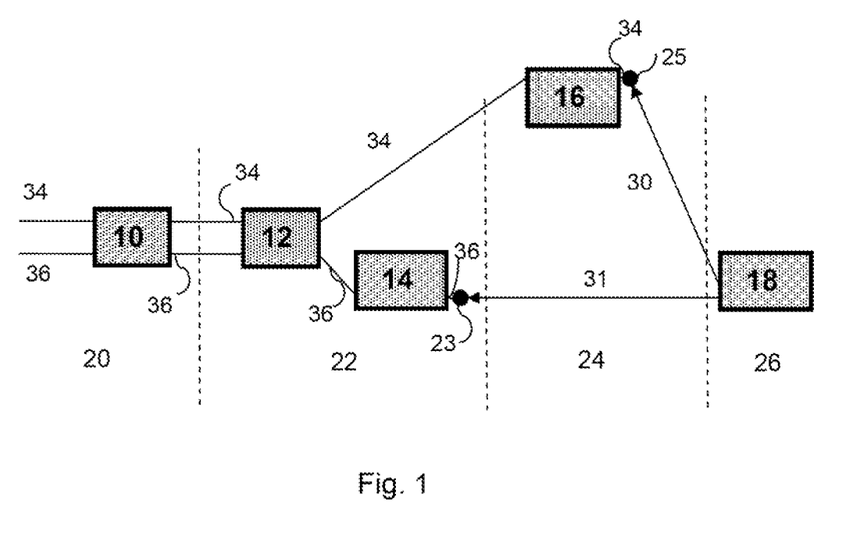
FIG. 1 is a schematic block diagram illustrating a communication network including apparatus embodiments.

FIG. 1 shows a schematic block diagram illustrating a communication network. The communication network is a network according to a 3GPP standard. The communication network is structurally separated in a user area 20, a local area 22, a home area 24 and a correspondent area 26.

The communication network comprises a mobile terminal, or user equipment, 10, a SGSN 12, a first GGSN 16, a second GGSN 14 and a correspondent node 18. The SGSN 12 may as well be a user plane entity (UPE), a Radio Network Controller (RNC) or a Long Term Evolution (LTE) eNodeB. The first GGSN 16 represents a first gateway node and the second GGSN 14 represents a second gateway node. The first GGSN 16 and the second GGSN 14 may as well be LTE System Architecture Evolution (SAE) gateways. The first GGSN 16 is located in the home area 24 of the user equipment 10 and the second GGSN 14 is located in the local area 22 of the user equipment 10, i.e. close to the user equipment 10. The embodiment according to FIG. 1 relates to a roaming situation of user equipment 10. Therefore, it is differentiated between "home" and "local" entities.

For setting up a first data session 34 between user equipment 10 and first GGSN 16 via SGSN 12, an attachment procedure is executed. For this purpose, a home primary PDP context (not shown) is established between user equipment 10 and first GGSN 16. The home primary PDP context is generated by user equipment 10. However, the home primary PDP context may as well be generated by the first GGSN 16. Reference sign 25 depicts the home network address. If user equipment 10 is located in the coverage area of the home network 24, network traffic 30 addressed to user equipment 10 is routed from correspondent node 18 via first GGSN 16 and SGSN 12 to user equipment 10. However, this flow of network traffic may not be optimal in case the user equipment 10 is not located in the coverage area of the GGSN 16. In this case, network capacity may be unnecessarily occupied.

As shown in FIG. 1, user equipment 10 may be located close to the second GGSN 14 and far away from the first GGSN 16. Furthermore, user equipment 10 may be located in another coverage area, i.e. in the local coverage area 22 of second GGSN 14. In such a situation, routing of network traffic via the first GGSN 16 may not be optimal. Ineffective triangle routing may unnecessarily occupy network capacity and delay network traffic transmission time. To avoid this, a second data session 36 between user equipment 10 and second GGSN 14 via SGSN 12 is set up. By means of an attachment procedure, a local primary PDP context (not shown) is established between user equipment 10 and GGSN 14. The local primary PDP context is generated by user equipment 10. However, the local primary PDP context may as well be generated by the second GGSN 14. Reference sign 23 depicts the local network address.

Accordingly, network traffic associated with the home primary PDP context, which was originally routed via data session 34, is switched to an association with the local primary PDP context, which is routed via data session 36. Thereby, a route optimized network flow 31 is provided. Optimized network traffic is routed from correspondent node 18 via second GGSN 14, SGSN 12 to user equipment 10. Non-route optimized network traffic is routed from correspondent node 18 via first GGSN 14, SGSN 12 to user equipment 10. Moreover, the home primary PDP context and the local primary PDP context are mapped on the same radio bearer and share network resources. As a result, the flow of network traffic obtains the required amount of network resources irrespective whether route optimization is used or not.

Figure 2:
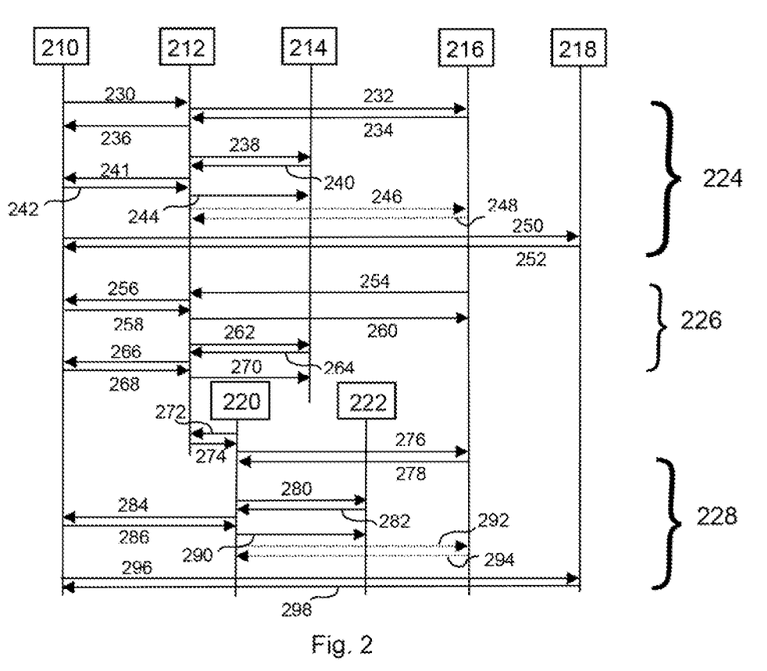
FIG. 2 is a signaling chart illustrating a first signaling embodiment in a communication network.

FIG. 2 shows an exemplary first signaling chart for route optimization. Deviating from the embodiment according to FIG. 1 relating to a roaming scenario, the embodiment according to FIG. 2 relates to route optimization within a single land mobile network (PLMN). The signaling chart shows the network elements user equipment 210, first SGSN 212, first local gateway node 214, home gateway node 216, correspondent node 218, second SGSN 220 and second local gateway node 222. The local and home gateways 214, 216 and 222 may as well be any network node which is capable of terminating PDP contexts and assigning IP addresses. The first and second SGSNs 212 and 220 may as well be RNCs or eNodeBs. The signaling chart consists of three signaling states, i.e. an attachment state 224, a secondary PDP context setup state 226 and a handover state 228.

In the embodiment according to FIG. 2, primary PDP contexts are set up immediately at the time of attachment of the user equipment 210 to the communication network. During attachment state 224, a primary PDP context for a data session between user equipment 210 and home gateway 216 is initially established, as indicated by arrows 230, 232, 234 and 236. As shown throughout FIG. 2, messages are acknowledged by acknowledgement messages. However, user equipment 210 has moved so far away from his home gateway 216 that routing of network traffic becomes sub-optimal, e.g. triangle routing may be present. For changing the gateway, a local primary PDP context is established during attachment state 224 between user equipment 210 and local gateway 214, as indicated by arrows 238, 240, 241, 242 and 244. The home gateway node 216 may still be responsible for home PDP contexts, however, the local gateway node 214, which is located closer to the user equipment 210, is allocated to the local PDP context. Thereby, user equipment 210 can keep its permanent IP address, its QoS and charging states. Furthermore, optimal routing is enabled.

The dashed arrows 246 and 248 indicate optional messages between the SGSN 212 and the home gateway 216 informing the home gateway that a local primary PDP context has been established. Thereafter, a Binding Update message is sent by user equipment 210 to correspondent node 218, as indicated by arrow 250. Acknowledgment of Binding Update message 250 is shown by arrow 252. In the embodiment according to FIG. 2, the home and local primary PDP contexts are established by the SGSNs. However, the home and local primary PDP contexts may as well be established by user equipment 210.

Next, the signaling for the secondary PDP context setup procedure 226 is described. In order to provide differentiated QoS for different network traffic flows, a secondary PDP context is established during secondary PDP context setup procedure 226. The secondary PDP context establishment is initiated by SGSN 212. However, the establishment of the secondary PDP contexts may as well be initiated by user equipment 210 or a policy control system (not shown). For the secondary PDP context setup procedure 226, first of all, a home secondary PDP context is established between user equipment 210 and home gateway 216, as indicated by arrows 254, 256, 258 and 260. During secondary PDP context setup procedure 226, a local secondary PDP context is as well established, as indicated by arrows 262, 264, 266, 268 and 270. Although the embodiment according to FIG. 2 only relates to network-initiated home secondary PDP context establishment, the establishment of local secondary PDP context is similar in case of user equipment-initiated home secondary PDP context establishment.

Secondary PDP contexts having different QoS for different network flows may also be established by the network's policy control infrastructure (not shown). For this purpose, an extension to the policy control infrastructure may be necessary. Such an extension may be implemented in the policy control system using a Policy Control Rating Function (PCRF)-to-PCRF interface (not shown). For example, the home PCRF may order the local PCRF to set-up the appropriate secondary PDP context for the local PDP context. Alternatively, the local PCRF or GGSN may automatically create a replica of all secondary PDP contexts established for the home PDP context. Such replicas may then be attached to the local primary PDP context and marked by sharing resources with the corresponding home secondary PDP context.

In the following, the signaling during the handover stage 228 is explained. Initially, the PDP context information is transferred from SGSN 212 to SGSN 220, as indicated by arrows 272 and 274. Thereafter, the home PDP contexts (several may be present at this stage) are updated, as indicated by arrows 276 and 278. Local PDP contexts (several may be present) are then established between the user equipment 210 and the new local gateway 222, as indicated by arrows 280, 282, 284, 286 and 290. During handover 228, user equipment 210 may have multiple home and local PDP contexts as a result of the secondary PDP context establishment procedure 226. The dashed arrows 292 and 294 represent optional messages indicating to the home gateway 216 that local PDP contexts have been established. Thereafter, the user equipment 210 sends a Binding Update message 296 to the correspondent node 208, which is acknowledged by an acknowledgment message indicated by arrow 298. During handover stage 228, the old local PDP context may optionally be removed (not shown in the embodiment according to FIG. 2).

Figure 3:
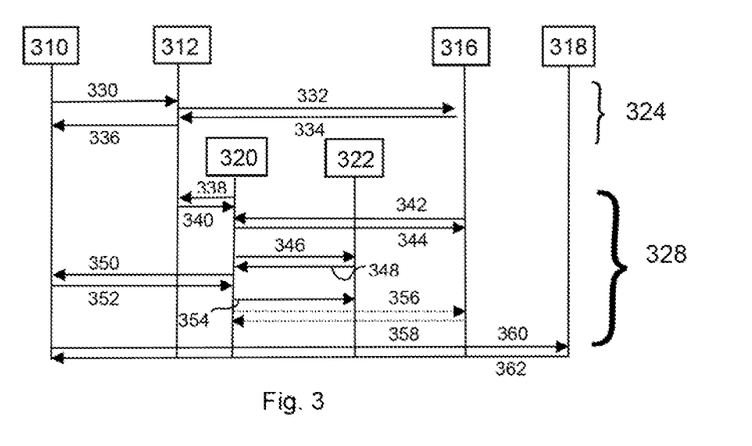
FIG. 3 is a signaling chart illustrating a second signaling embodiment in a communication network.

FIG. 3 shows an exemplary second signaling chart for route optimization. The signaling chart shows a user equipment 310, a first SGSN 312, a home gateway node 316, a second SGSN 320, a local gateway node 322 and a correspondent node 318.

The user equipment 310 attaches to the communication network within its home network. Therefore, initially no local primary PDP context is established. Thereafter, the user equipment 310 moves from the coverage area of its home gateway 316 to the coverage area of the local gateway 322. Therefore, the local primary PDP context is established after handover.

The signaling chart consists of an attachment stage 324 and a handover stage 328. During the attachment stage 324, a home primary PDP context is established between user equipment 310 and home gateway 316 via SGSN 312, as indicated by arrows 330, 332, 334 and 336. Thereafter, for providing handover 328, the home primary PDP context information is transferred from SGSN 312 to SGSN 320, as indicated by arrows 338 and 340. Subsequently, the home PDP context is updated, as indicated by arrows 342 and 344. Thereafter, a local PDP context is established between user equipment 310 and local gateway 322, as indicated by arrows 346, 348, 350, 352 and 354. The dashed arrows 356 and 358 represent optional messages informing the home gateway 316 that local PDP contexts have been established. Thereafter, the user equipment 310 sends a Binding Update message to correspondent node 318, as indicated by arrow 360. This Binding Update message 360 is acknowledged by acknowledgment message 362.

In the embodiment according to FIG. 3, SGSN 312 and SGSN 320 initiate the local PDP context establishment. However, this local PDP context establishment may also be performed by user equipment 310.

Figure 4:
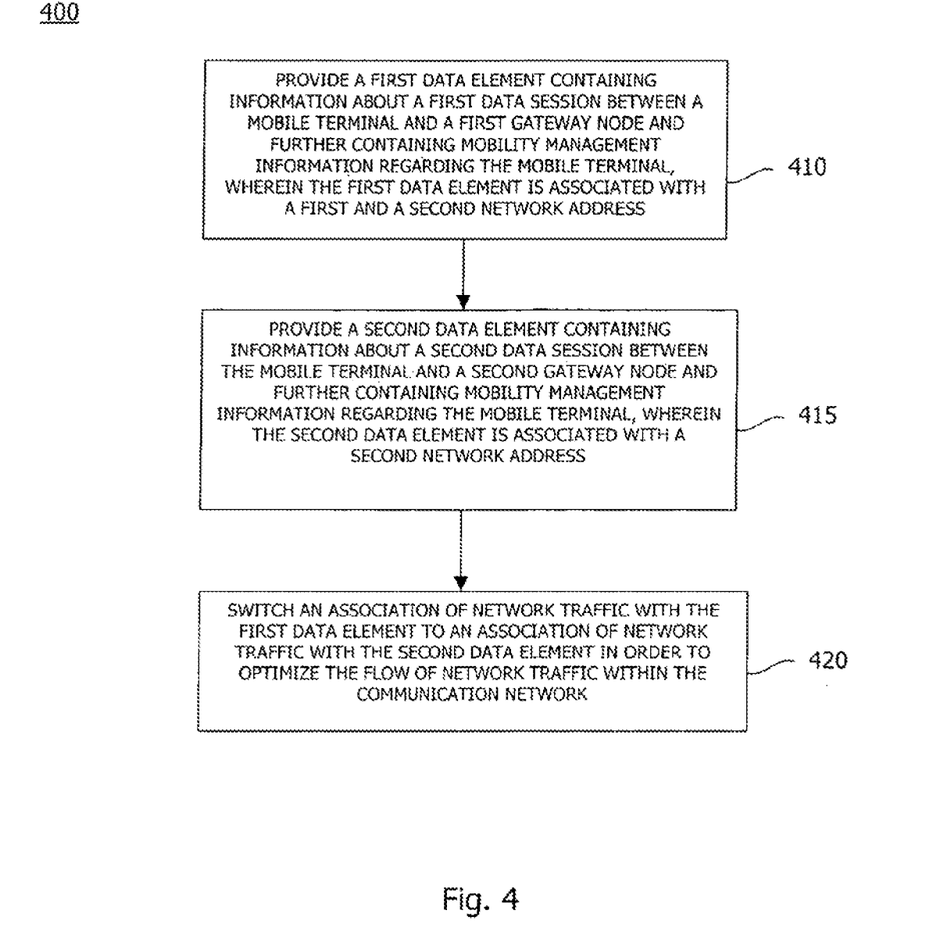
FIG. 4 is a flow chart illustrating a first method embodiment.

FIG. 4 shows a flow chart 400 of a first method embodiment. The method embodiment relates to route optimization in a communication network and may be practiced by a user equipment or a gateway node as shown in FIG. 1 or by other apparatuses.

The method starts in step 410 by providing a first data element containing information about a first data session between a mobile terminal and a first gateway node and further containing mobility management information regarding the mobile terminal. The first data element is associated with a first network address. In the embodiment according to FIG. 1, the first data element may be provided between user equipment 10 and first GGSN 16. In a next step 415, a second data element containing information about a second data session between the mobile terminal and a second gateway node and further containing mobility management information regarding the mobile terminal is provided. The second data element is associated with a second network address. In the embodiment according to FIG. 1, the second data element may be provided between user equipment 10 and second GGSN 14. Thereafter, in step 420, an association of network traffic with the first data element is switched to an association of network traffic with the second data element. Thereby, the flow of network traffic within the communication network is optimized. In the embodiment according to FIG. 1, network traffic 30 may be switched to the route optimized path 31.

Figure 5:
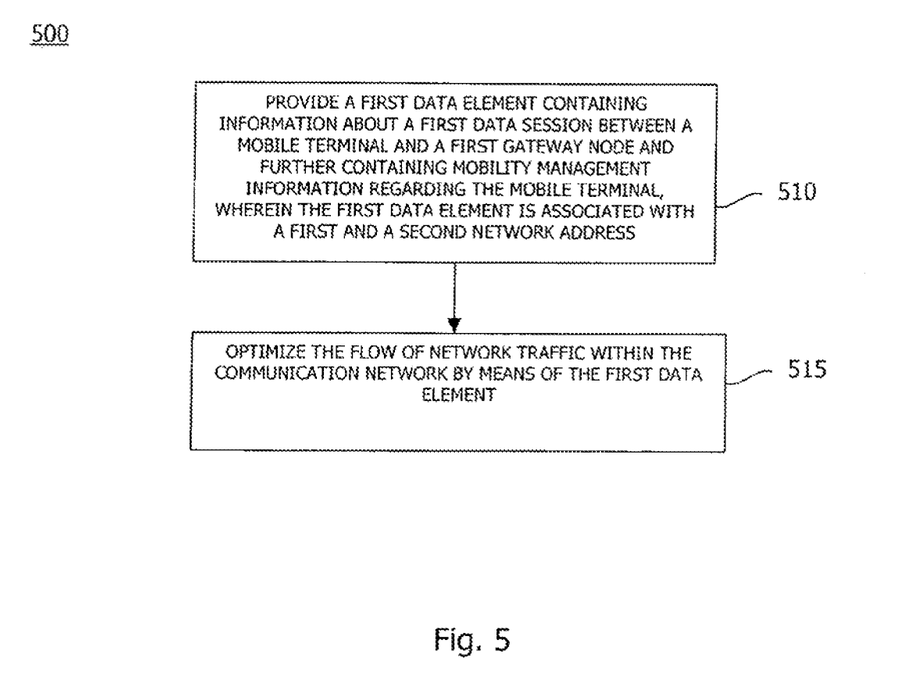
FIG. 5 is a flow chart illustrating a second method embodiment.

FIG. 5 shows a flow chart 500 of a second method embodiment. The method embodiment relates to route optimizing in a communication network and may be practiced by a user equipment or a gateway node as shown in FIG. 1 or by other apparatuses.

As shown in FIG. 5, the method starts in step 510 by providing a first data element containing information about a first data session between a mobile terminal and a first gateway node and further containing mobility management information regarding the mobile terminal. The first data element is associated with a first and a second network address. In the embodiment according to FIG. 1, the first data element may be provided between user equipment 10 and first GGSN 16. Moreover, the first data element may comprise two IP addresses. In a next step 515, the flow of network traffic within the communication network is optimized by means of the first data element. In the embodiment according to FIG. 1, network traffic 30 may be switched to the route optimized path 31.

Figure 6:
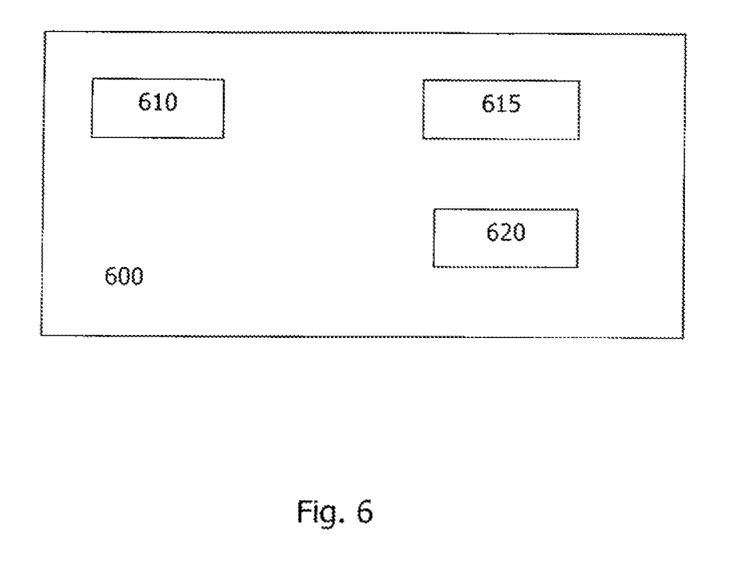
FIG. 6 is a schematic block diagram illustrating a first embodiment of a network node.

FIG. 6 shows a schematic block diagram illustrating a first apparatus embodiment of a network node 600. The network node may be a gateway node shown in FIG. 1 or another network element.

The network node 600 comprises a function 610 for providing a first data element containing information about a first data session between a mobile terminal and a first gateway node and further containing mobility management information regarding the mobile terminal, wherein the first data element is associated with a network address. In the embodiment according to FIG. 1, the network node may be the first GGSN 16 and the first data element may be provided between user equipment 10 and first GGSN 16. The network node 600 further comprises a function 615 for providing a second data element containing information about a second data session between the mobile terminal and a second gateway node and further containing mobility management information regarding the mobile terminal, wherein the second data element is associated with a second network address. In the embodiment according to FIG. 1, the second data element may be provided between user equipment 10 and second GGSN 14. Additionally, the network node 600 comprises a function 620 for switching an association of network traffic with the first data element to an association of network traffic with the second element in order to optimize the flow of network traffic within the communication network. In the embodiment according to FIG. 1, network traffic 30 may be switched to the route optimized path 31.

Figure 7:
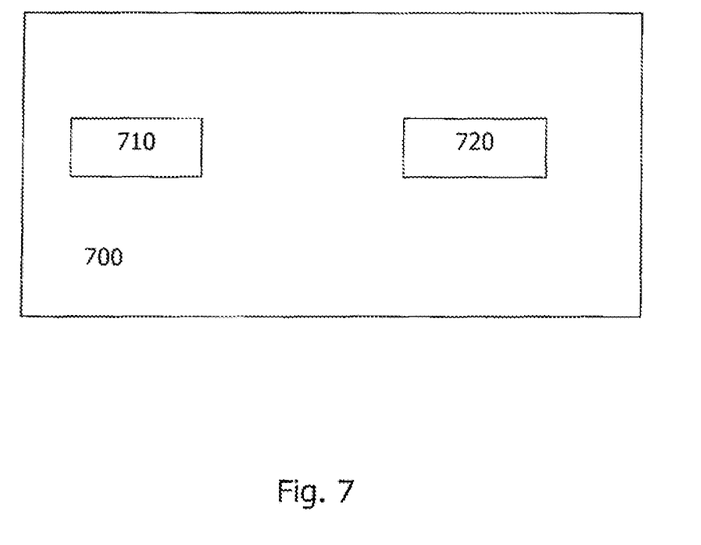
FIG. 7 is a schematic block diagram illustrating a second embodiment of a network node.

FIG. 7 shows a further schematic block diagram illustrating a second embodiment of a network node. The network node may be a gateway node shown in FIG. 1 or another network element.

Network node 700 comprises a function 710 for providing a first data element containing information about a first data session between a mobile terminal and a first gateway node and further containing mobility management information regarding the mobile terminal, wherein the first data element is associated with a first and a second network address. In the embodiment according to FIG. 1, the network node may be the first GGSN 16 and the first data element may be provided between user equipment 10 and first GGSN 16. Network node 700 further comprises a function 720 for optimizing the flow of network traffic within the communication network by means of the second data element. In the embodiment according to FIG. 1, network traffic 30 may be switched to the route optimized path 31.

Figure 8:
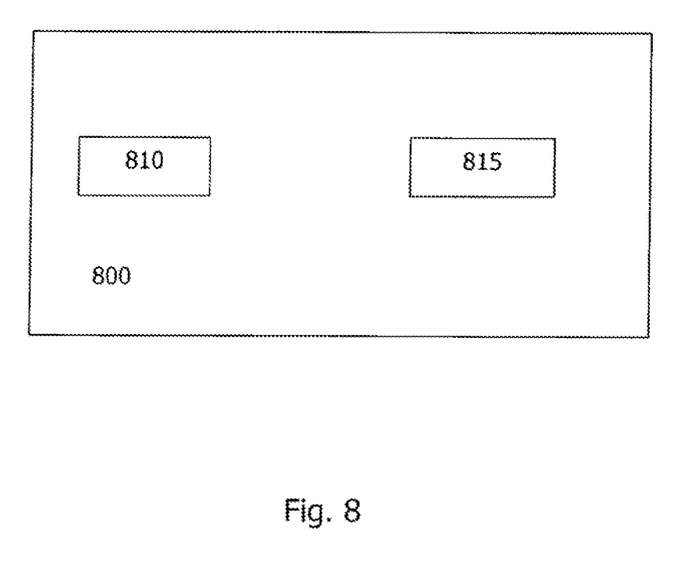
FIG. 8 is a schematic block diagram illustrating an embodiment of a mobile terminal.

FIG. 8 shows a schematic block diagram of a user equipment 800. The user equipment may be the user equipment shown in FIG. 1 or any other mobile terminal.

User equipment 800 comprises a function 810 for providing a first data element containing information about a first data session between a mobile terminal and a first gateway node and further containing mobility management information regarding the mobile terminal, wherein the first data element is associated with a first network address. In the embodiment according to FIG. 1, the user equipment may be user equipment 10 and the first data element may be provided between user equipment 10 and first GGSN 16. User equipment 800 further comprises a function 815 for providing a second data element containing information about a second data session between the mobile terminal and a second gateway node and further containing mobility management information regarding the mobile terminal, wherein the second data element is associated with a second network address. In the embodiment according to FIG. 1, the second data element may be provided between user equipment 10 and second GGSN 14. The second data element is used for optimizing the flow of network traffic within the communication network. In the embodiment according to FIG. 1, network traffic 30 may be switched to the route optimized path 31.

Figure 9:
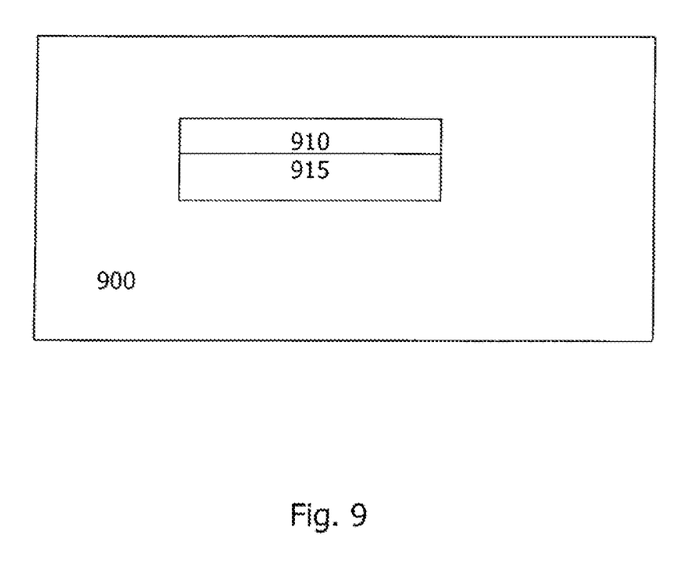
FIG. 9 is a schematic block diagram illustrating an embodiment of a traffic flow template.

FIG. 9 shows a schematic block diagram of a traffic flow template 900. The traffic flow template may be used for providing data sessions in the communication network shown in FIG. 1 or in other communication networks.

The traffic flow template 900 is capable of being assigned to a data element which is containing information about a data session between a mobile terminal and a gateway node and mobility management information regarding the mobile terminal. In the embodiment according to FIG. 1, the data session may be established between user equipment 10 and first GGSN 16. The traffic flow template 900 comprises information 910 regarding routing of network traffic. Furthermore, the traffic flow template 900 comprises information 915 regarding whether the information regarding routing of network traffic is related to an optimized network route. In the embodiment according to FIG. 1, non-route optimized network traffic may be routed via the first GGSN 16 and route optimized network traffic may be routed by means of the traffic flow template via the second GGSN 14.

As has been already mentioned, the present techniques are not limited to GTP, PDP contexts or MIPv6 but may be used by all kind of L2 technologies. For example, Worldwide Interoperability for Microwave Access (WiMAX) network service flows and Code Division Multiple Access (CDMA) 2000 bearers may be combined with route optimization according to the present technique for route optimization.

Moreover, end-to-end mobility protocols other than Mobile IP may be used. Such protocols may allow the mobile terminal to send additional location information to the correspondent node in case multiple attachments are available. Examples for such additional protocols include, but are not limited to, HIP or shim6.

When using the present route optimization scheme for MIPv6, the MIPv6 implementation may have to be modified. MIPv6 has to work with the home subnet being always directly reachable. All non-route optimized traffic is sent via the home primary PDP context. Moreover, additional interfaces have to be recognized and used for route optimization, even if the mobile terminal is technically at home. Thereby, the mobile terminal can operate without having a home agent. However, the mobile terminal may initiate route optimization.

For implementing the present route optimization scheme in 3GPP networks, an extension to the mobile terminal may be necessary so that at least two primary PDP contexts for route optimization can be established. Alternatively, the second primary PDP context could also be established by the communication network itself. If the second primary PDP context is established by the communication network, the network has to indicate to the mobile terminal that the second established primary PDP context can be used for route optimization.

When implementing the present technique for route optimization with GTP, the advantage is provided that mobile terminals may initiate route optimization, whereby all QoS features supported in GTP are still available. Moreover, any host based multi-homing mechanism may be enabled in combination with GTP.

As a further advantage of the present technique for route optimization, there is no need to replace any network roaming interfaces or provide relevant changes to network operator roaming agreements.

Furthermore, not only the QoS but also the charging properties of the network traffic can be retained. This may even be the case if route optimization is initiated.

Moreover, the present technique for route optimization solves local breakout problems inside a Home Public Mobile Network (HPLMN). Furthermore, such problems are not only solved in the case of roaming.

Although embodiments of the present invention have been illustrated in the accompanying drawings and described in the description, it will be understood that the invention is not limited to the embodiments disclosed herein. In particular, the invention is capable of numerous rearrangements, modifications and substitution without departing from the spirit of the invention as set forth and defined by the following claims.

The invention claimed is:

1. A method for route optimization in communication network, the method comprising the following steps:
providing a first data element containing information about a first data session between a mobile terminal and a first gateway node and further containing mobility management information regarding the mobile terminal, wherein the first data element is associated with a first network address, wherein the first data element is setup when an attachment procedure is executed between the mobile terminal and the first gateway node;
providing a second data element containing information about a second data session between the mobile terminal and a second gateway node and further containing mobility management information regarding the mobile terminal, wherein the second data element is associated with a second network address and is coexisting with the first data element, wherein the second data element is setup when an attachment procedure is executed between the mobile terminal and the second gateway node, and wherein the mobile terminal is attached to both the first gateway node and the second gateway node; and
switching an association of network traffic with the first data element to an association of network traffic with the second data element in order to optimize the flow of network traffic within the communication network, wherein the first and the second data elements are mapped on the same radio bearer to share network resources.

2. The method of claim 1, wherein the mobility management information comprises a tunnel ID.

3. The method of claim 1, further comprising the steps of
providing a third data element which is associated with the first data element; and
providing a fourth data element which is associated with the second data element.

4. The method of claim 3, wherein the second and the third data element comprise information regarding network resource reservation.

5. The method of claim 1, wherein the data elements are generated by at least the mobile terminal, a support node, the first gateway node, the second gateway node or a policy control system.

6. The method of claim 1, further comprising the step of sending a Binding Update message to a correspondent node.

7. The method of claim 1, wherein all non-route optimized network traffic is associated with the first data element.

8. A network node comprising:
a combined hardware/software function for providing a first data element containing information about a first data session between a mobile terminal and a first gateway node and further containing mobility management information regarding the mobile terminal, wherein the first data element is associated with a first network address, wherein the first data element is setup when an attachment procedure is executed between the mobile terminal and the first gateway node;
a combined hardware/software function for providing a second data element containing information about a second data session between the mobile terminal and a second gateway node and further containing mobility management information regarding the mobile terminal, wherein the second data element is associated with a second network address and is coexisting with the first data element, wherein the second data element is setup when an attachment procedure is executed between the mobile terminal and the second gateway node, and wherein the mobile terminal is attached to both the first gateway node and the second gateway node; and
a combined hardware/software function for switching an association of network traffic with the first data element to an association of network traffic with the second data element in order to optimize the flow of network traffic within the communication network, wherein the first and the second data elements are mapped on the same radio bearer to share network resources.

9. A mobile terminal comprising:
a combined hardware/software function for providing a first data element containing information about a first data session between the mobile terminal and a first gateway node and further containing mobility management information regarding the mobile terminal, wherein the first data element is associated with a first network address, wherein the first data element is setup when an attachment procedure is executed between the mobile terminal and the first gateway node;
a combined hardware/software function for providing a second data element containing information about a second data session between the mobile terminal and a second gateway node and further containing mobility management information regarding the mobile terminal, wherein the second data element is associated with a second network address and is coexisting with the first data element, wherein the second data element is setup when an attachment procedure is executed between the mobile terminal and the second gateway node, and wherein the mobile terminal is attached to both the first gateway node and the second gateway node;
wherein the second data element is used for switching the flow of network traffic within the communication network from a network path between the mobile terminal and the first gateway node to a network path between the mobile terminal and the second gateway node,
wherein the first and the second data elements are mapped on the same radio bearer to share network resources.

10. A communication network comprising:
a first gateway node,
a second gateway node, and
a network node comprising:
a combined hardware software function for providing a first data element containing information about a first data session between a mobile terminal and the first gateway node and further containing mobility management information regarding the mobile terminal, wherein the first data element is associated with a first network address, wherein the first data element is setup when an attachment procedure is executed between the mobile terminal and the first gateway node;
a combined hardware/software function for providing a second data element containing information about a second data session between the mobile terminal and the second gateway node and further containing mobility management information regarding the mobile terminal wherein the second data element is associated with a second network address and is coexisting with the first data element, wherein the second data element is seta when an attachment procedure is executed between the mobile terminal and the second gateway node, and wherein the mobile terminal is attached to both the first gateway node and the second gateway node; and
a combined hardware/software function for switching an association of network traffic with the first data element to an association of network traffic with the second data element in order to optimize the flow of network traffic within the communication network, wherein the first and the second data elements are mapped on the same radio bearer to share network resources.

11. A method for route optimization in a communication network, the method comprising the following steps:
providing a home primary packet data protocol (PDP) context containing information about a first data session between a mobile terminal and a first Gateway GPRS Support Node (GGSN) and further containing mobility management information regarding the mobile terminal, wherein the home primary PDP context is associated with a first internet protocol (IP) address, wherein the home primary PDP context is setup when an attachment procedure is executed between the mobile terminal and the first GGSN via a Serving GPRS Support Node (SGSN):
providing a local primary PDP context containing information about a second data session between the mobile terminal and a second GGSN and further containing mobility management information regarding the mobile terminal, wherein the local primary PDP context is associated with a second IP address and is coexisting with the home primary PDP context, wherein the local primary PDP context is setup when an attachment procedure is executed between the mobile terminal and the second GGSN via the SGSN, and wherein the mobile terminal is attached to both the first GGSN and the second GGSN; and switching an association of network traffic with the home primary PDP context to an association of network traffic with the local primary PDP context in order to optimize the flow of network traffic within the communication network, wherein the home primary PDP context and the local primary POP context are mapped on the same radio bearer to share network resources.

12. A communication network for enabling communications between a mobile station and a correspondent node, the communication network, comprising:

a first Gateway GPRS Support Node (GGSN),
a second Gateway GPRS Support Node (GGSN), and
a Serving GPRS Support Node (SGSN);
the SGSN configured to execute an attachment procedure to setup a first data session between the mobile terminal and the first GGSN, wherein during the attachment procedure there is provided a home primary packet data protocol (PDP) context containing information about the first data session between the mobile terminal and the first GGSN and further containing mobility management information regarding the mobile terminal, wherein the home primary PDP context is associated with a first internet protocol (IP) address;

the SGSN further configured to execute an attachment procedure to setup a second data session between the mobile terminal and the second GGSN, wherein during the attachment procedure there is provided a local primary PDP context containing information about a second data session between the mobile terminal and a second GGSN and further containing mobility management information regarding the mobile terminal, wherein the local primary PDP context is associated with a second IP address and is coexisting with the home primary PDP context, and wherein the mobile terminal is attached to both the first GGSN and the second GGSN; and the SGSN is further configured to switch an association of network traffic with the home primary PDP context to an association of network traffic with the local primary PDP context in order to optimize the flow of network traffic within the communication network, wherein the home primary PDP context and the local primary PDP context are mapped on the same radio bearer to share network resources.

* * * * *

UNITED STATES PATENT AND TRADEMARK OFFICE
CERTIFICATE OF CORRECTION

PATENT NO. : 8,503,306 B2  
APPLICATION NO. : 12/811337  
DATED : August 6, 2013  
INVENTOR(S) : Turanyi et al.

Page 1 of 1

It is certified that error appears in the above-identified patent and that said Letters Patent is hereby corrected as shown below:

In the Claims

In Column 14, Line 28, in Claim 10, delete "terminal" and insert -- terminal, --, therefor.

In Column 14, Line 31, in Claim 10, delete "seta" and insert -- setup --, therefor.

In Column 14, Line 55, in Claim 11, delete "(SGSN):" and insert -- (SGSN); --, therefor.

In Column 15, Line 6, in Claim 11, delete "POP" and insert -- PDP --, therefor.

Signed and Sealed this
Thirty-first Day of December, 2013

Margaret A. Focarino
*Commissioner for Patents of the United States Patent and Trademark Office*